United States Patent
Narita et al.

(10) Patent No.: US 7,205,053 B2
(45) Date of Patent: *Apr. 17, 2007

(54) RE ALLOY COATING FOR DIFFUSION BARRIER

(75) Inventors: Toshio Narita, Hokkaido (JP);
Shigenari Hayashi, Hokkaido (JP);
Takayuki Yoshioka, Kanagwa (JP);
Hiroshi Yakuwa, Kanagawa (JP)

(73) Assignees: Japan Science and Technology Agency, Saitama (JP); Ebara Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/494,014

(22) PCT Filed: Sep. 13, 2002

(86) PCT No.: PCT/JP02/09479

§ 371 (c)(1),
(2), (4) Date: Nov. 5, 2004

(87) PCT Pub. No.: WO03/038152

PCT Pub. Date: May 8, 2003

(65) Prior Publication Data

US 2005/0064227 A1    Mar. 24, 2005

(30) Foreign Application Priority Data

Oct. 31, 2001    (JP)    ............................ 2001-335914

(51) Int. Cl.
*B32B 15/00*    (2006.01)
(52) U.S. Cl. ................... 428/655; 416/241 B; 420/433
(58) Field of Classification Search ............... 428/655, 428/667
See application file for complete search history.

(56) References Cited

U.S. PATENT DOCUMENTS 5,993,980 A    11/1999    Schmitz et al.

(Continued)

FOREIGN PATENT DOCUMENTS

JP    03-120327    5/1991

(Continued)

OTHER PUBLICATIONS

Patent Abstracts of Japan, Publication No. 11-061439, dated Mar. 5, 1999.

(Continued)

*Primary Examiner*—Jennifer McNeil
*Assistant Examiner*—Gordon R. Baldwin
(74) *Attorney, Agent, or Firm*—Westerman, Hattori, Daniels & Adrian, LLP.

(57)    ABSTRACT

Disclosed is a Re alloy coating for diffusion barrier, such as a high-temperature equipment member, which comprises an atomic composition of 30% to less than 90% Re; and an atomic composition of 5% to less than 60% X (wherein X is at least one selected from the group consisting of Cr, Mo and W), with the remainder except for inevitable impurities being at least one selected from the group consisting of Ni, Fe and Co. Even if the alloy coating for diffusion barrier includes a diffusion layer containing at least one of the group consisting of Al, Si and Cr, a desired alloy composition of the alloy coating for diffusion barrier can be assured by a surface coating process and diffused components from the substrate while substantially preventing the diffusion of the elements of the diffusion layer during a homogenizing heat treatment. The alloy coating for diffusion barrier may include a Re-containing-alloy stress relief layer inserted between the film and the substrate. The Re alloy coating can suppress the deterioration of the substrate and the coating layer due to the reaction therebetween to provide an extended life span of the equipment member.

8 Claims, 6 Drawing Sheets

U.S. PATENT DOCUMENTS

| | | | |
|---|---|---|---|
| 6,299,986 B1 | 10/2001 | Meelu | |
| 6,306,524 B1* | 10/2001 | Spitsberg et al. | 428/651 |
| 6,746,782 B2* | 6/2004 | Zhao et al. | 428/632 |

FOREIGN PATENT DOCUMENTS

| | | |
|---|---|---|
| JP | 09-143667 | 6/1997 |
| JP | 11-061439 | 3/1999 |
| WO | WO 97/46734 | 12/1997 |

OTHER PUBLICATIONS

Patent Abstracts of Japan, Publication No. 03-120327, dated May 22, 1991.

Patent Abstracts of Japan, Publication No. 09-143667, dated Jun. 3, 1997.

Toshio Narita et al.; High-Temperature Corrosion and Protection 2000, 2000 Science Reviews, pp. 351-357, no month given.

Toshio Narita et al; Corrosion 2001, Paper No. 01157, no month given.

Narita; Shoji; Hisamatsu; Yoshida; Fukumoto and Hayashi; *Rhenium Coating as a Diffusion Barrier on a Nickel-based Superalloy in High Temperature Oxidation*; High-Temperature Corrosion and Protection 2000; pp. 351-357, no month given.

Narita; Hayashi; Shoji; Hisamatsu Yoshida and Fukumoto; *Application of Rhenium Coating as a Diffusion Barrier to Improve the High Temperature Oxidation Resistance of Nickel-based Superalloy*; Corrosion 2001; Paper No. 01157; pp. 1-11, no month given.

Shoji, Hisamatsu, Hayashi and Narita: *Guidelines To Develop Technologies Aiming At Oxidation Resistance In Ultrahigh Temperature Application Of Rhenium-Based Alloy Coating To Nickel-Based Supper Alloy*, Report of the 123rd Committee on Heat Resisting Materials and Alloys, Japan Society for the Promotion of Science vol. 41, pp. 127-134(Mar. 2000).

Yoshida, Hisamatsu, Hayashi, Narita, Noguchi, Yakuwa, and Miyasaka: *Forming Coating As A Diffusion Barrier And Oxidation Resistance Property*, Prepared manuscript for the $47^{th}$ Material And Environment Symposium, pp. 141-142, Japan Society Corrosion Engineering Corrosion Center, Yamaguchi (Oct. 2000).

Hisamatsu, Yoshida, Hayashi, Narita, Murakami, and Harada: *Diffusion Barrier Properties Of Re Coating Film And Oxidation Resistance Of Nickel-Based Super-Alloy*, Prepared Manuscripts for the $47^{th}$ Material And Environmental Symposium, pp. 153, Japan Society Corrosion Engineering Corrosion Center, Yamaguchi (Oct. 2000).

Yoshida, Hayashi, Narita, Noguchi, Yakuwa, and Miyasaka: *Forming Process Of Re Diffusion Barrier And Changes In Structures Of Oxidized Coating*, Prepared manuscripts for the $48^{th}$ Material And Environmental Symposium, pp. 395, Japan Society Corrosion Engineering Corrosion Center, Sapporo (Sep. 2001).

* cited by examiner

RE ALLOY COATING FOR DIFFUSION BARRIER

TECHNICAL FIELD

The present invention relates to a technology for extending the life span of a member for use in high-temperature equipment, such as a gas turbine blade, a turbine blade for a jet engine or a boiler tube.

BACKGROUND ART (1) Thermal Barrier Coating (TBC)

A high-temperature equipment member, such as an industrial gas turbine blade or a boiler tube, has a coated surface to obtain enhanced heat resistance and corrosion resistance, in many cases. With regard to heat resistance, a ceramics coating, so-called thermal barrier coating (TBC), is typically applied to the equipment member.

In use of ceramics, an alloy layer, so-called undercoat (or bondcoat), is generally inserted between a ceramics layer and a metal substrate to assure adhesion therebetween, because the relatively large difference in thermal expansion coefficient between ceramics and substrate metal is likely to cause peeling of the ceramics layer at the TBC/substrate interface. However, under an ultra-high temperature environment of about 800 to 1200° C., the undercoat will be deteriorated due to reaction with the substrate, or the peeling of the ceramics layer will occur due to an oxide layer thickly grown on the surface of the undercoat. This leads to a serious problem that the equipment member has a short life span of several months.

(2) Al (or Cr, Si) Diffusion Coating Process

With regard to corrosion resistance, the equipment member is typically subjected to an Al (or Cr, Si) diffusion coating process. However, under an ultra-high temperature environment of about 800 to 1200° C., a protective film cannot be stably maintained for a long time-period due to significantly high diffusion rate and high reactivity of a metal element contributing to corrosion resistance. Further, under a severe corrosive environment containing Cl or S, an metal element, such as Cr or Al, constituting the protective film will be quickly consumed even in a temperature range of 500 to 800° C., which leads to difficulties in maintaining the protective film stably for a long time-period, and a serious problem of significantly shortened life span in the equipment member.

(3) Ni—Cr Thermal Spraying

For providing enhanced corrosion resistance, a high Ni-high Cr alloy thermal sprayed coating is applied to the equipment member, in some cases. However, this case involves the same problem as that in the above (2).

(4) TBC System Combined with Re-Added Undercoat

Japanese Patent Laid-Open Publication No. 11-61439 discloses a TBC system including an undercoat with Re (Rhenium) added thereto at 12 weight % or more (several % by atomic composition). Japanese Patent Laid-Open Publication No. 2000-511236 titled "Structural Component including Superalloy Substrate and Layer Structure formed thereon, and Production Method thereof" discloses an undercoat for a TBC, containing Re in the range of 35 to 60 weight % (about 15 to 30% by atomic composition). These publications discloses neither the function of Re nor the effect of the Re addition. U.S. Pat. No. 6,299,986 discloses a superalloy article in which a barrier coating containing 4 wt % or less of Re is formed on a Ni-based superalloy substrate containing 5.0 to 7.0 wt % of Re.

(5) Re Coating & Re alloy Coating

Japanese Patent Laid-Open Publication No. 03-120327 discloses a protective film containing 1 to 20 wt % of Re and 22 to 50 wt % of Cr. Japanese Patent Laid-Open Publication No. 09-143667 discloses a production method of a high-temperature member comprising pure Re, Re—Mo alloy or Re—W alloy. The method disclosed in this publication is intended to produce a Re or Re alloy structural member which is used independently in the form of a thin plate.

DISCLOSURE OF INVENTION

Under existing circumstances involving the aforementioned unsolved problems, there is no other choice but to lower the operating temperature of the high-temperature equipment at the sacrifice of the performance thereof so as to assure a desired life span of the equipment member.

Despite of various researches on a method using Re or Re alloy as a diffusion barrier, the inventors could not find out an intended layer structure capable of stably providing a diffusion barrier performance.

[1. Shoji, Hisamatsu, Hayashi, Narita, "Development guideline of technologies for improvement of oxidation resistance as countermeasures for ultra-high temperature—Application of rhenium-based alloy coating to Ni-based superalloy—", the 123rd Committee Report, Heat-Resistant Material, Japan Society for the Promotion of Science, Vol. 141, pp 127 (March 2000);

2. T. Narita et al., "Rhenium coating as a diffusion barrier on a nickel-based superalloy in high temperature oxidation", Proc of HTCP2000. pp 351, Science Reviews, Hokkaido (September 2000);

3. Yoshida, Hisamatsu, Hayashi, Noguchi, Yakuwa, Miyasaka, "Formation of diffusion barrier layer through plating process & Oxidation resistance", Journal of the 47th "Materials & Environments" symposium, pp 141, Japan Society of Corrosion Engineering, Yamaguchi (October 2000);

4. Hisamatsu, Yoshida, Hayashi, Narita, Murakami, Harada, "Diffusion barrier characteristics of Re coating film & Oxidation resistance of Ni-based superalloy", Journal of the 47th "Materials & Environments" symposium, pp 153, Japan Society of Corrosion Engineering, Yamaguchi (October 2000); and 5. T. Narita et al., "Application of rhenium coating as a diffusion barrier to improve the high temperature oxidation resistance of nickel-based superalloy", Paper No. 01157, CORROSION 2001, NACE Intl, Huston (March 2001)].

The present invention is directed to suppress the problem of the anti-corrosion coating formed through the conventional TBC system, Al (or Cr, Si) diffusion coating process or thermal splaying, or the deterioration of a substrate and a coating layer due to the reaction therebetween, so as to provide intended life span of a high-temperature equipment member.

A Re (or Ir, Rh, Pt, W) alloy layer can be coated on the surface of a substrate, or inserted between a substrate and a TBC layer to provide an excellent diffusion barrier layer. However, if Re in the Re alloy coating is contained at a low concentration, or a specific alloy, such as Re—Ni binary alloy, incapable of forming a stable alloy phase with Re under high temperature is used, a Re—Ni alloy phase will be separated into a Re-rich phase and a counter-element (e.g. Ni)-rich phase, resulting in deteriorated diffusion barrier function.

The inventors have found that a stable alloy phase can be formed even at high temperature by using a specific alloy element in a Re alloy coating to be coated on a substrate and setting Re in the alloy coating at a higher concentration, so as to bring out an excellent function as a diffusion barrier layer, The present invention provides an excellent diffusion barrier layer based on this knowledge.

Specifically, the present invention provides a Re alloy coating for diffusion barrier, comprising an atomic composition of 30% to less than 90% Re, and an atomic composition of 5% to less than 60% X (wherein X is at least one selected from the group consisting of Cr, Mo and W), with the remainder except for inevitable impurities being at least one selected from the group consisting of Ni, Fe and Co. The Re alloy coating allows the substrate to have an excellent heat resistance and corrosion resistance.

The alloy coating for diffusion barrier may include a stress relief layer inserted between the substrate and the alloy coating. This structure can suppress a crack of the alloy coating caused by the difference in thermal expansion between the substrate and alloy coating and the substrate to maintain the alloy coating as a continuous layer, so as to more effectively utilize the heat resistance and corrosion resistance of the alloy coating.

The alloy coating for diffusion barrier may further include a diffusion layer laminated on the Re alloy coating. The diffusion layer contains at least one selected from the group consisting of Al, Si and Cr. In this structure, the Re alloy coating can prevent the diffusion of an element causing the deterioration of corrosion resistance (e.g. Ti, Nb, Ta) from the substrate to the diffusion layer, and the diffusion of an element causing the deterioration of phase stability (e.g. Al, Si, Cr) from the diffusion layer to the substrate. Thus, an excellent oxidation resistance and the strength of the substrate can be maintained for a long time-period.

The alloy coating for diffusion barrier may further include a heat barrier ceramics laminated on the Re alloy coating. The heat barrier ceramics allows the above materials to be used under high temperature.

BEST MODE FOR CARRYING OUT THE INVENTION

Figure 1:
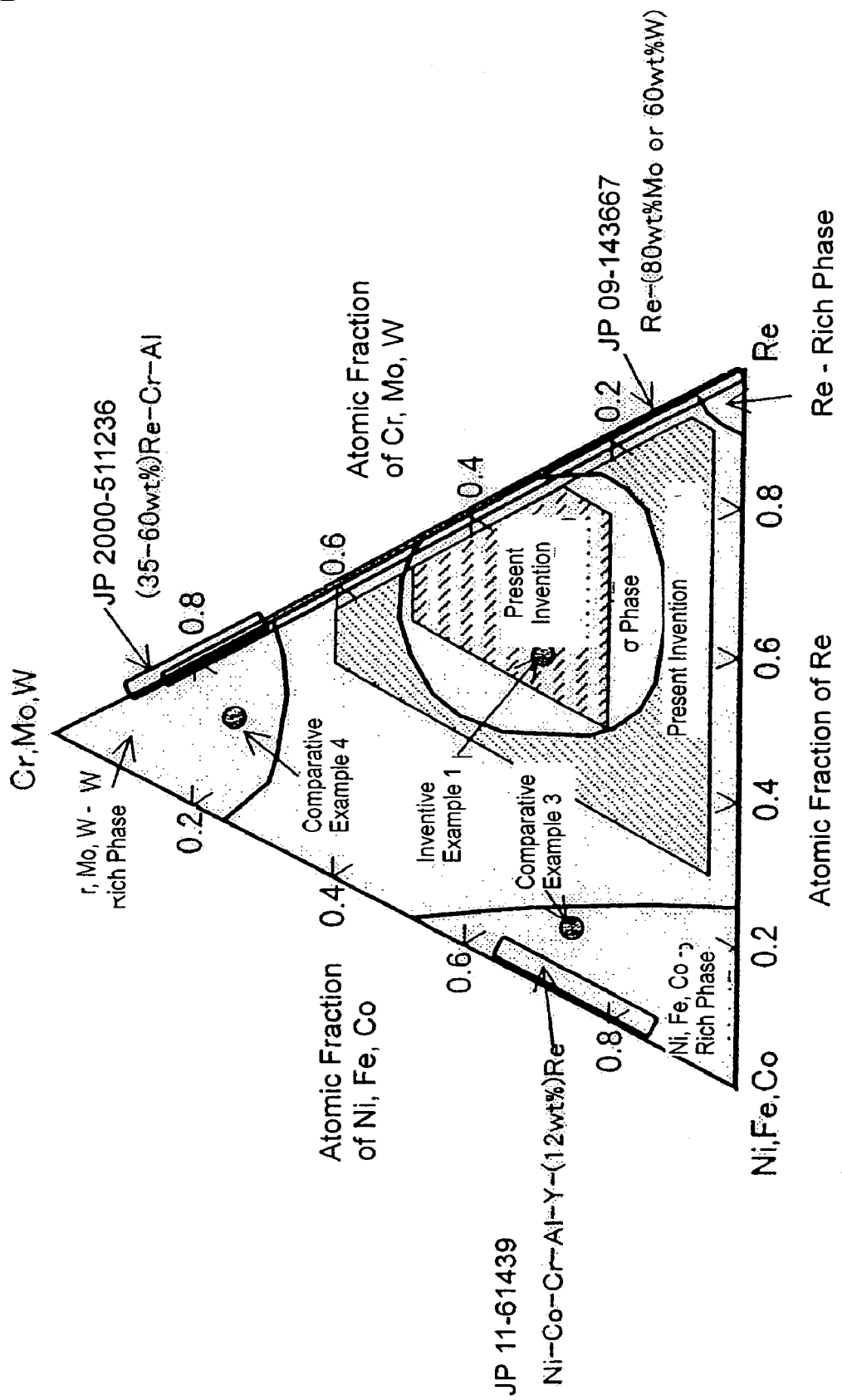
FIG. 1 is a phase diagram of a Re—(Cr, Mo, W)—(Ni, Fe, Co) alloy under high temperature, which comparatively shows an alloy composition of a diffusion barrier Re alloy coating of the present invention and a conventional example.

The present invention will now be described in detail.

The present invention relates to a Re alloy coating for diffusion barrier, which comprises an atomic composition of 30% to less than 90% Re, and an atomic composition of 5% to less than 60% X (wherein X is at least one element selected from the group consisting of Cr, Mo and W), with the remainder except for inevitable impurities being at least one selected from the group consisting of Ni, Fe and Co. In order to sufficiently bring out the function of the alloy coating as a diffusion barrier layer, Re is required to be alloyed with at least one element selected from the group consisting of Cr, Mo and W, and at least one element selected from the group consisting of Ni, Co and Fe. Further, an atomic composition of the alloy coating is required to have 30% to less than 90% of Re, 5% to less than 60% of X or the total of at least one element selected from the group consisting of Cr, Mo and W, and the remainder except for inevitable impurities being at least one selected from the group consisting of Ni, Fe and Co.

If Re is less than 30%, the rate of (the element other than Re)-rich phase will be increased to cause the deterioration in diffusion barrier function of the alloy coating. If Re is 90% or more, a Re single-phase will be created. Differently from a Re alloy phase, the Re single-phase is apt to allow cracks to be introduced therein due to thermal shock. Further, due to poor adhesion between the Re single-phase and the substrate, the alloy coating cannot stably exist as a diffusion layer on the surface of the substrate for a long time-period. Therefore, the concentration of Re is limited in the range of 30% to less than 90% by atomic composition. Preferably, the concentration of Re is in the range of 40% to less than 70% by atomic composition. At least one of Cr, Mo and W can be alloyed with Re to form a stable phase so-called σ phase. This σ phase allows the alloy coating to bring out an excellent diffusion barrier function. If X (or the total of at least one of Cr, Mo and W) is less than 5%, a Re single-phase will be created, or no σ phase will be formed. If X is 60% or more, an X-rich phase will be created in larger rate than that of the σ phase to cause the deterioration in diffusion barrier function of the alloy coating. Thus, X (or the total of at least one of Cr, Mo and W) is limited in the range of 5% to less than 60%. Preferably, the concentration of X is in the range of 20% to less than 50% by atomic composition.

At least one of Ni, Fe and Co can be alloyed with a Re—X (or Cr, Mo, W) alloy to effectively extend the stable region of the σ phase. A stable σ phase in the Re—X alloy can be obtained at a Re concentration of about 50 to 70 atomic %. By contrast, if it is further alloyed with at least one of Ni, Fe and Co, the stable region of the σ phase will be extended in the range of about 30 to 80 atomic % Re.

As a heat-resistant alloy for the substrate, a Ni, Fe or Co-based alloy is used in many cases. The adhesion between the substrate and the Re alloy coating can be improved by containing these elements in the film. Thus, it is preferable that the element to be alloyed is Ni if the substrate is made of a Ni-based alloy, or Fe if the substrate is made of a Fe-based alloy, or Co if the substrate is made of a Co-based alloy.

Based on the above description, an alloy composition range effective to a diffusion barrier layer is shown in FIG. 1 together with a phase diagram of the Re—(Cr, Mo, W)—(Ni, Fe, Co) alloy. For comparison, respective alloy composition ranges of conventional examples are also shown in FIG. 1. As shown in FIG. 1, the composition ranges of the alloy coatings disclosed in the Japanese Patent Laid-Open Publication Nos. 2000-511236 and No. 11-61439 as the conventional examples are a Cr-rich phase and a Ni-rich phase, respectively. Thus, these alloy coating cannot act as a diffusion barrier layer.

The film disclosed in the Japanese Patent Laid-Open Publication No. 09-143667 contains none of Ni, Fe and Co. Thus, the film is apt to be cracked due to thermal shock, and poor in adhesion with a substrate. As described in the specification of the Japanese Patent Laid-Open Publication No. 09-143667, this film is used by itself without being coated on a substrate. If this film is used after coated on a substrate, the film will be readily cracked to cause the deterioration in heat resistance and corrosion resistance.

By contrast, as seen in FIG. 1, the alloy coating of the present invention has a composition centered on the σ phase region serving as an excellent diffusion barrier layer so as to bring out an excellent diffusion barrier function. In addition, the alloy coating contains at least one of Ni, Fe and Co, which is a primary component of the heat-resistant alloy used in the substrate. Thus, the alloy coating has excellent adhesion with the substrate, so that the alloy coating coated on the substrate can be used while adequately maintaining the coated state for a long time-period.

While the Re alloy coating can be preferably formed through a magnetron sputtering process, a physical deposition process, a chemical deposition process or thermal spraying process may be used to form the same alloy coating. A process for forming the Re alloy coating with the desired composition is not limited to these processes, but the desired Re alloy coating may be formed by diffusing alloy components of the substrate to the film through a heat treatment. For example, after a Re—Cr alloy coating is formed on a substrate through one of the above processes, it may be subjected to a heat treatment to diffuse Ni in the substrate thereto so as to form a Re—Re—Ni alloy layer. In either case, the alloy coating is preferably subjected to a heat treatment at a high temperature in vacuum under a non-oxidation atmosphere, such as an inert atmosphere, to homogenize the composition and structure of the Re layer or Re alloy layer coated on the substrate. In this manner, when the alloy coating for diffusion barrier of the present invention includes a diffusion layer containing at least one selected from the group consisting of Al, Si and Cr, the components of the substrate can be diffused while substantially preventing the elements of Al, Si and Cr from being diffused.

When the alloy coating for diffusion barrier of the present invention includes a stress relief layer inserted between the substrate and the alloy layer, the stress relief layer is preferably a Re—(Cr, Mo, W)—(Ni, Fe, Co) alloy layer, for example, wherein the Re concentration is reduced by about 5 to 20 atomic %, and the concentration of either one of Ni, Fe and Co is increased by about 5 to 20 atomic %, as compared to those of the diffusion barrier layer. This structure can suppress cracks in the alloy coating due to the difference in thermal expansion coefficient between the substrate and the alloy coating so as to maintain the alloy coating as a continuous layer to more effectively bring out the heat resistance and corrosion resistance of the alloy coating.

As a process for laminating the diffusion layer containing at least one selected from the group consisting of Al, Si and Cr, a conventional process, such as a pack process or a CVD process, may be appropriately used. For example, a receptor layer for Al, Si or Cr to be diffused may be formed by plating a metal layer containing at least one selected from the group consisting of Ni, Fe and Co, on a Re—Cr alloy coating, and subjecting the alloy coating with the metal layer to a diffusion treatment at a high temperature to form an alloy layer containing these elements.

When the alloy coating for diffusion barrier of the present invention further includes a heat barrier ceramics laminated on the diffusion-barrier alloy coating, the ceramics preferably includes at least one selected from the group consisting of $ZrO_2$, CaO, MgO, $SiO_2$ and $Al_2O_3$. The heat barrier ceramics can provide a lower temperature of the internal alloy layer to suppress the growth of oxide on the surface of the alloy coating and the diffusion between the alloy coating and the substrate so as to maintain the structural stability of the alloy coating and the substrate for an extended time-period.

EXAMPLE

Inventive Example 1

After an 80 atomic % Re-20 atomic % Ni alloy coating was coated on a Ni-based alloy of Inconel 718 (Ni-19% Cr-19% Fe-5% Nb-3% Mo-0.9% Ti-0.4% Al (weight %)) for use in a rotor blade or stationary blade of a gas turbine, the Ni-based alloy was Ni-plated, and then subjected to an Al diffusion coating. Specifically, the alloy coating was formed by coating an 80 atomic % Re-20 atomic % Ni alloy on the surface of the substrate through a magnetron sputtering process using the Re—Ni alloy as a target, and then subjecting the substrate with the alloy layer to a homogenizing heat treatment in vacuum at 1100° C. for 5 hours.

A Watts bath was used for the Ni plating. Specifically, the plating conditions were set as follows: a bath composition [the weight ratio of $NiSO_4 \cdot 7H_2O$:$NiCl_2$:$H_3BO_3$=20:3:2], pH=5, a bath temperature of 50° C., and a current density of 50 mA/cm². The Al diffusion coating was performed under the condition that the substrate with coated Re alloy and plated-Ni was heated at 1000° C. in vacuum for 5 hours while being immersed in a mixed powder of a Ni-50 atomic % Al alloy powder and an $Al_2O_3$ powder.

Figure 2:
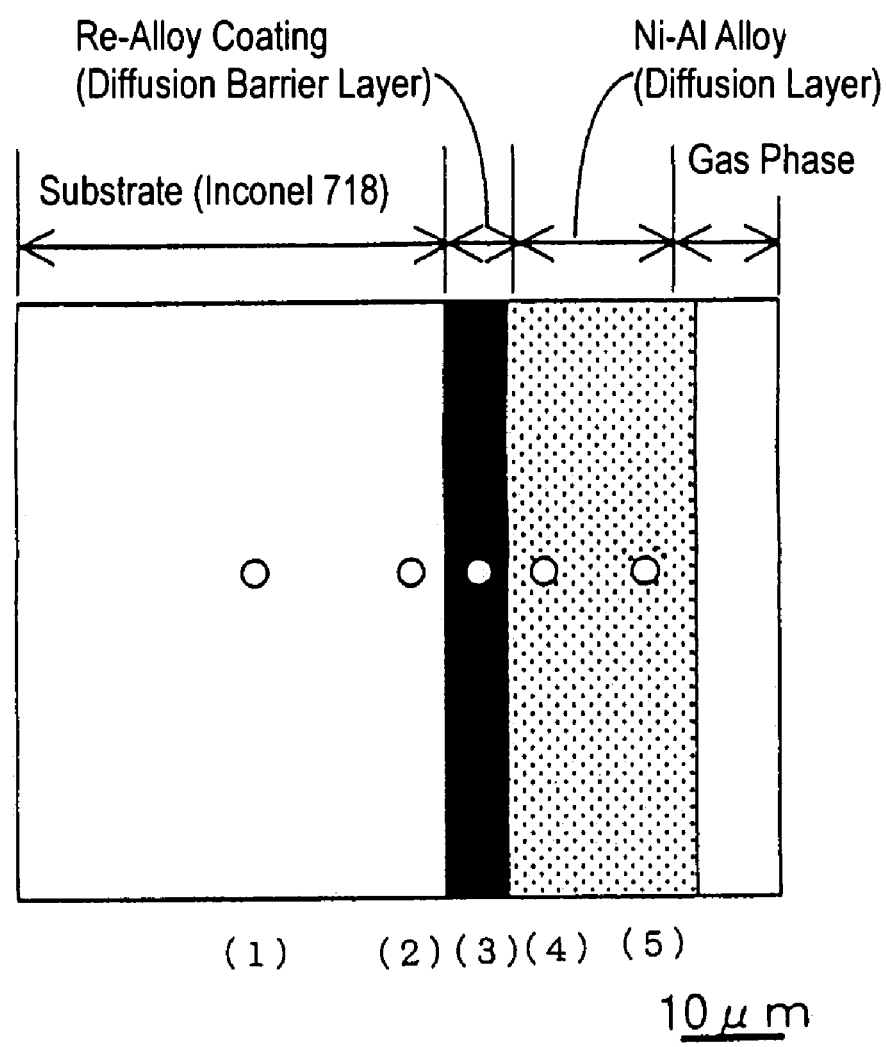
FIG. 2 is a schematic diagram showing the sectional structure of a Ni-based alloy in Inventive Example 1.
Figure 3:
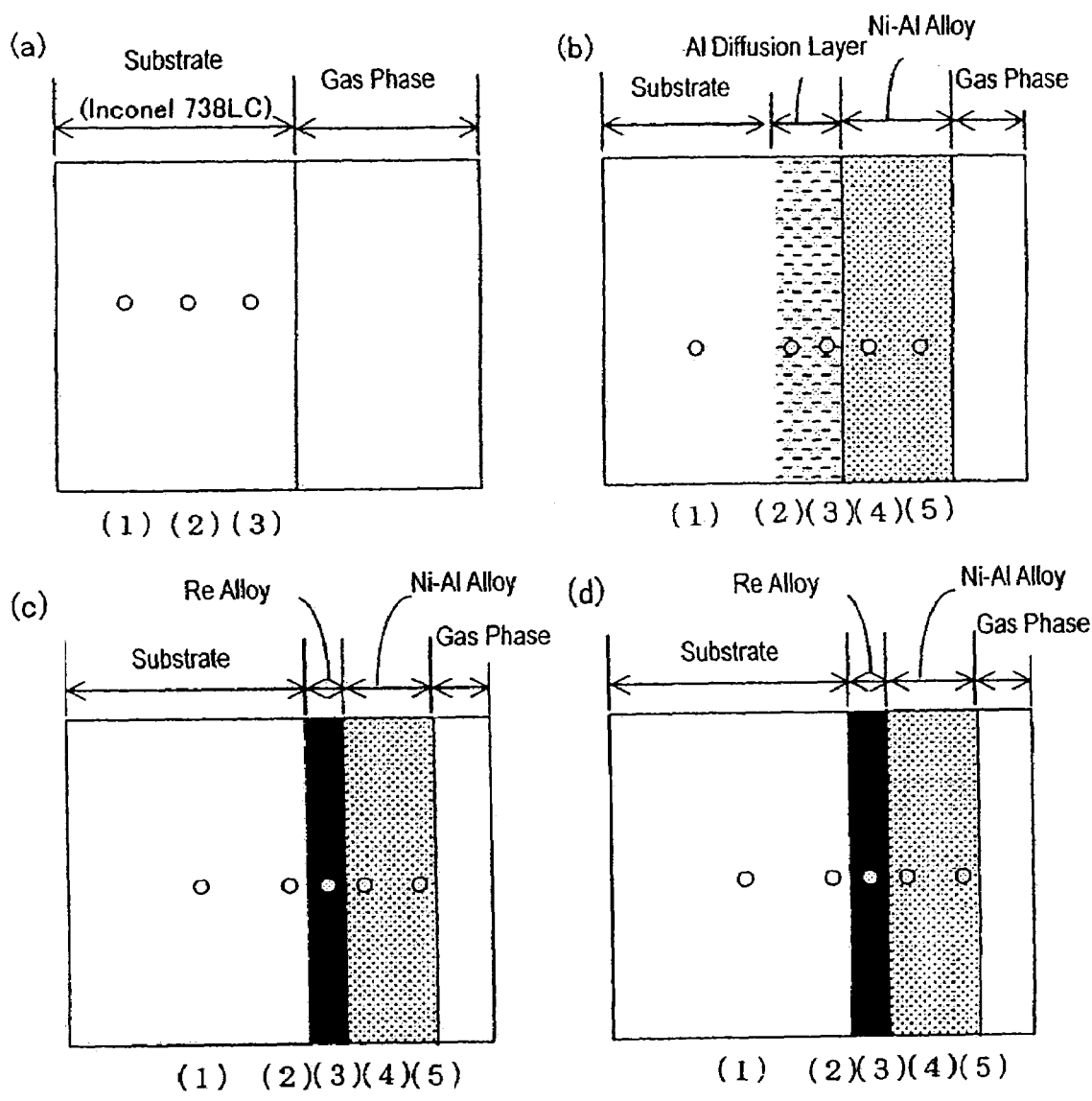
FIGS. 3(a) to 3(d) are schematic diagrams showing the sectional structures of Ni-based alloys in Comparative Examples 1 to 4, respectively.
Figure 4:
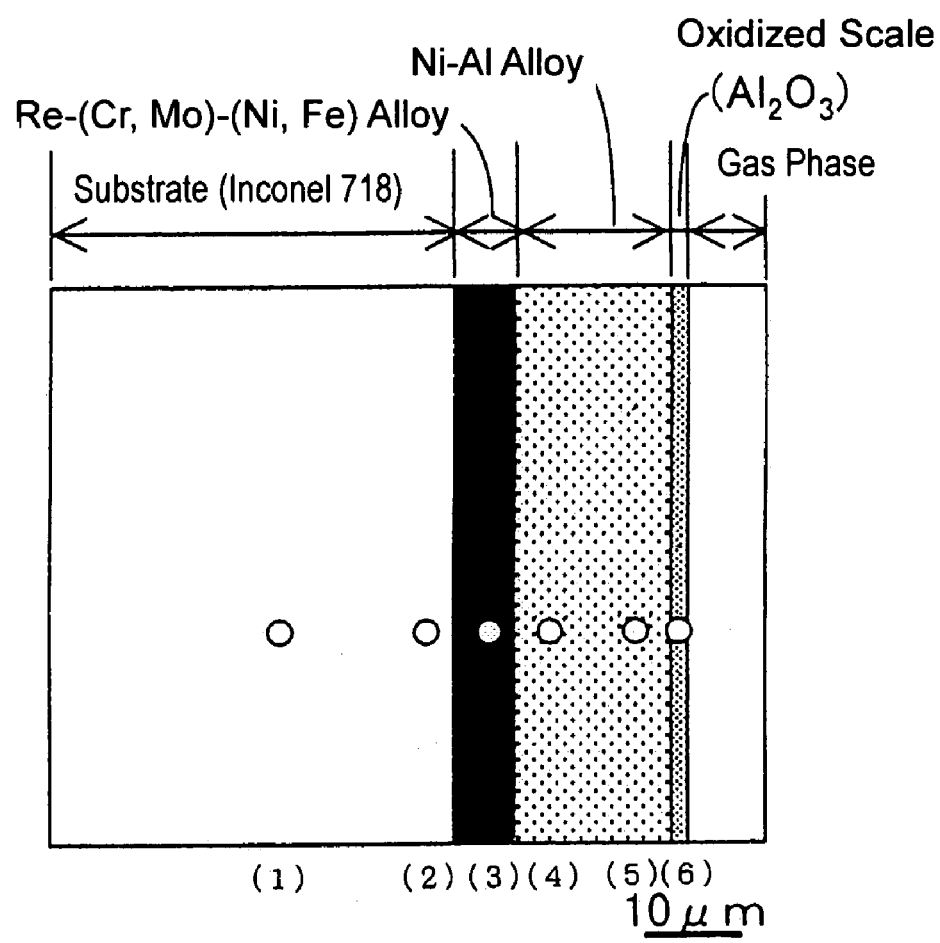
FIG. 4 is a schematic diagram showing the sectional structure of the Ni-based alloy in Inventive Example 1 after oxidized in the atmosphere at 1100° C. for one month.
Figure 5:
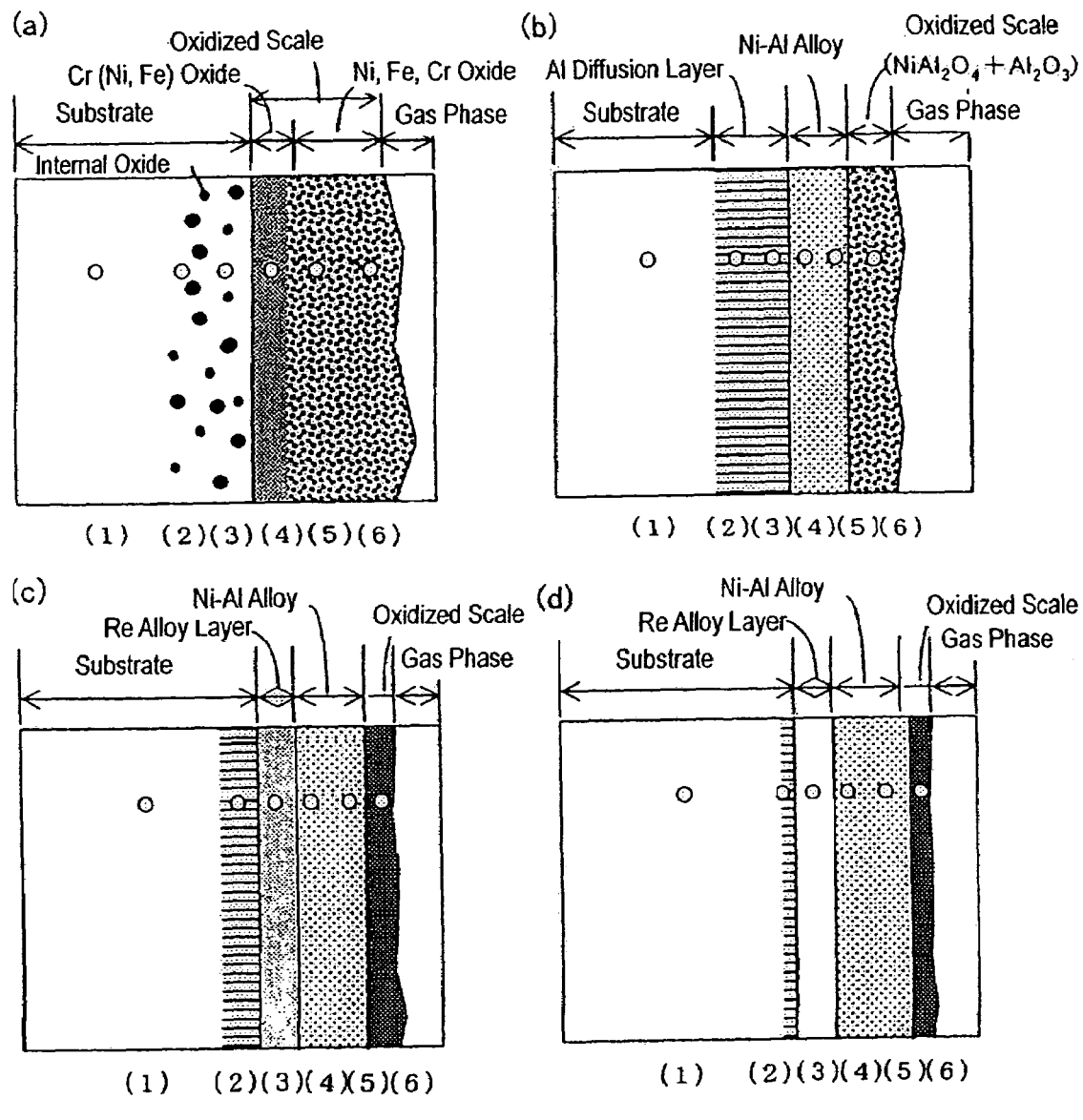
FIGS. 5(a) to 5(d) are schematic diagrams showing the sectional structures of Ni-based alloys in Comparative Examples 1 to 4 after oxidized in the atmosphere at 1100° C. for one month, respectively.

FIG. 2 shows the sectional structure of the Ni-based alloy after the treatment. Further, Table 1 shows the analysis result of the composition of each point in FIG. 2 using an electron probe microanalyzer (EPMA). The data (1) to (5) in Table 1 correspond to the points (1) to (5) in FIG. 2, respectively.

TABLE 1

|    | (1)  | (2)  | (3)  | (4)  | (atomic %) (5) |
|----|------|------|------|------|------|
| Re | 0.0  | 0.1  | 47.4 | 0.0  | 0.0  |
| Ni | 53.6 | 53.1 | 15.2 | 50.2 | 50.3 |
| Cr | 21.2 | 20.5 | 24.6 | 0.0  | 0.0  |
| Fe | 18.5 | 18.9 | 8.2  | 0.0  | 0.0  |
| Mo | 1.5  | 1.2  | 4.3  | 0.0  | 0.0  |
| Nb | 2.9  | 3.2  | 0.1  | 0.0  | 0.0  |
| Al | 1.2  | 1.5  | 0.1  | 49.8 | 49.7 |
| Ti | 1.1  | 1.5  | 0.1  | 0.0  | 0.0  |

As seen in Table 1, after the post-treatment, the 80 atomic % Re-20 atomic % Ni alloy coating is formed as an alloy coating having an atomic composition of 47.4% Re, 24.6% Cr, 15.2% Ni, 8.2% Fe and 4.3% Mo, or [47% Re, 28.9% (Cr, Mo) and 23.4% (Ni, Fe)]. That is, the alloy coating has a composition of the a phase (see FIG. 1).

COMPARATIVE EXAMPLES 1 to 4

FIGS. 3(a), 3(b), 3(c) and 3(d) show the sectional structures of a pure Ni-based alloy (Inconel 718) as Comparative Example 1, a Ni-based alloy (Inconel 718) subjected only to an Al diffusion coating as Comparative Example 2, a Ni-based alloy (Inconel 718) subjected to a Ni-plating and an Al diffusion coating after coating a 20 atomic % Re-60 atomic % Ni-20 atomic % Cr alloy coating thereon, as Comparative Example 3, and a Ni-based alloy (Inconel 718) subjected to a Ni-plating and an Al diffusion coating after coating a 20 atomic % Re-80 atomic % Cr alloy coating thereon, as Comparative Example 4, respectively.

The Re alloy coating was formed by coating a 20 atomic % Re-60 atomic % Ni-20 atomic % Cr alloy in Comparative Example 3, or a 20 atomic % Re-80 atomic % Cr alloy in Comparative Example 4, on the substrate through a magnetron sputtering process, and subjecting the substrate with the alloy to a heat treatment at 1100° C. in vacuum for 5 hours. The respective conditions of the Ni plating and the Al diffusion coating process were the same as those in Inventive example 1.

Table 2 shows the analysis result of the composition of each point of the section of the Ni-based alloy in Comparative Example 1. The data (1) to (3) in Table 2 correspond to the points (1) to (3) in FIG. 3(a), respectively.

TABLE 2

|  | (1) | (2) | (3) (atomic %) |
|---|---|---|---|
| Re | 0.0 | 0.0 | 0.0 |
| Ni | 53.0 | 52.8 | 53.2 |
| Cr | 20.0 | 19.8 | 19.7 |
| Fe | 20.2 | 19.7 | 19.9 |
| Mo | 1.9 | 2.0 | 2.2 |
| Nb | 3.0 | 2.7 | 3.1 |
| Al | 0.9 | 1.1 | 1.0 |
| Ti | 0.9 | 0.7 | 0.9 |

Table 3 shows the analysis result of the composition of each point of the section of the Ni-based alloy in Comparative Example 2. The data (1) to (5) in Table 3 correspond to the points (1) to (5) in FIG. 3(b), respectively.

TABLE 3

|  | (1) | (2) | (3) | (4) | (atomic %) (5) |
|---|---|---|---|---|---|
| Re | 0.0 | 0.0 | 0.0 | 0.0 | 0.0 |
| Ni | 53.3 | 52.1 | 48.8 | 39.8 | 40.7 |
| Cr | 21.0 | 18.0 | 16.5 | 4.6 | 4.2 |
| Fe | 18.7 | 15.3 | 13.1 | 6.2 | 4.9 |
| Mo | 1.9 | 2.0 | 2.2 | 0.1 | 0.0 |
| Nb | 2.7 | 2.9 | 2.8 | 0.2 | 0.2 |
| Al | 1.2 | 7.9 | 14.7 | 48.8 | 48.8 |
| Ti | 1.0 | 1.8 | 1.9 | 0.3 | 0.2 |

Table 4 shows the analysis result of the composition of each point of the section of the Ni-based alloy in Comparative Example 3. The data (1) to (5) in Table 4 correspond to the points (1) to (5) in FIG. 3(c), respectively.

TABLE 4

|  | (1) | (2) | (3) | (4) | (atomic %) (5) |
|---|---|---|---|---|---|
| Re | 0.0 | 0.9 | 10.3 | 0.7 | 0.0 |
| Ni | 53.5 | 54.8 | 41.8 | 40.3 | 40.7 |
| Cr | 20.8 | 18.0 | 16.9 | 7.1 | 4.2 |
| Fe | 19.1 | 16.1 | 15.1 | 8.1 | 4.9 |
| Mo | 1.6 | 1.8 | 2.2 | 0.5 | 0.0 |
| Nb | 3.0 | 2.9 | 2.8 | 1.0 | 0.6 |
| Al | 1.0 | 4.5 | 10.1 | 42.0 | 49.5 |
| Ti | 1.0 | 1.0 | 0.8 | 0.3 | 0.1 |

Table 5 shows the analysis result of the composition of each point of the section of the Ni-based alloy in Comparative Example 4. The data (1) to (5) in Table 5 correspond to the points (1) to (5) in FIG. 3(d), respectively.

TABLE 5

|  | (1) | (2) | (3) | (4) | (atomic %) (5) |
|---|---|---|---|---|---|
| Re | 0.0 | 1.2 | 10.8 | 1.2 | 0.0 |
| Ni | 53.2 | 51.3 | 9.7 | 33.4 | 38.6 |
| Cr | 19.8 | 25.4 | 65.5 | 21.6 | 9.8 |
| Fe | 20.4 | 15.0 | 5.3 | 4.2 | 2.6 |
| Mo | 1.6 | 1.8 | 1.9 | 0.4 | 0.0 |
| Nb | 3.0 | 2.3 | 1.1 | 1.0 | 0.5 |
| Al | 0.9 | 2.0 | 4.9 | 37.8 | 48.3 |
| Ti | 1.1 | 1.0 | 0.8 | 0.4 | 0.2 |

In each of Comparative Examples 2 to 4, the Al concentration in the vicinity of the surface of the coating layer composed of the Re alloy coating and the Ni—Al alloy diffusion layer is about 50 atomic %, which is approximately the same as that in Inventive Example 1. However, differently from Inventive Example 1, in all of Comparative examples 2 to 4, Al and Ti/Nb are clearly diffused to the substrate and the coating layer, respectively.

Further, in Comparative Example 3, after the post-treatment, the 20 atomic % Re-60 atomic % Ni-20 atomic % Cr alloy coating is formed as an alloy coating having an atomic composition of 10.3% Re, 41.8% Ni, 16.9% Cr, 15.1% Fe, 2.2% Mo, 2.8% Nb, 10.1% Al and 0.8% Ti, or [10.3% Re, 19.1% (Cr, Mo), 56.9% (Ni, Fe), 10.1% Al and 3.6% (Nb, Ti)]. That is, the alloy coating has a composition corresponding to the Ni, Fe-rich phase in FIG. 1, which is close to the composition of the alloy disclosed in the Japanese Patent Laid-Open Publication No. 11-61439 as one of the conventional examples.

In Comparative Example 4, after the post-treatment, the 20 atomic % Re-80 atomic % Cr alloy coating is formed as an alloy coating having an atomic composition of 10.8% Re, 9.7% Ni, 65.5% Cr, 5.3% Fe, 1.9% Mo, 1.18% Nb, 4.9% Al and 0.8% Ti, or [10.8% Re, 67.4% (Cr, Mo), 15.0% (Ni, Fe), 4.9% Al and 1.9% (Nb, Ti)]. That is, the alloy coating has a composition corresponding to the Mo-rich phase in FIG. 1, which is close to the composition of the alloy disclosed in the Japanese Patent Laid-Open Publication No. 2000-511236 as one of the conventional examples.

FIG. 4 and FIGS. 5(a) to 5(d) show the sectional structures of Inventive Example 1 and Comparative Examples 1 to 4 after oxidized in the atmosphere at 1100° C. for one month. FIG. 2 corresponds to FIG. 4, and FIGS. 3(a) to 3(d) correspond to FIGS. 5(a) to 5(d), respectively.

Table 6 shows the analysis result of the composition of each point of the section of an oxidized test piece of the Ni-based alloy in Inventive Example 1. The data (1) to (6) in Table 6 correspond to the points (1) to (6) in FIG. 4, respectively.

TABLE 6

| | (1) | (2) | (3) | (4) | (5) | (atomic %) (6) |
|---|---|---|---|---|---|---|
| Re | 0.0 | 0.1 | 48.0 | 0.1 | 0.0 | 0.0 |
| Ni | 53.6 | 53.1 | 13.9 | 49.8 | 51.5 | 0.0 |
| Cr | 21.2 | 20.9 | 25.6 | 0.2 | 0.0 | 0.0 |
| Fe | 18.5 | 18.4 | 8.2 | 0.0 | 0.0 | 0.0 |
| Mo | 1.5 | 1.3 | 4.0 | 0.1 | 0.0 | 0.0 |
| Nb | 2.9 | 3.2 | 0.1 | 0.0 | 0.0 | 0.0 |
| Al | 1.2 | 1.5 | 0.1 | 49.8 | 48.5 | 39.8 |
| Ti | 1.1 | 1.5 | 0.1 | 0.0 | 0.0 | 0.0 |
| O | 0.0 | 0.0 | 0.0 | 0.0 | 0.0 | 60.2 |

Table 7 shows the analysis result of the composition of each point of the section of an oxidized test piece of the Ni-based alloy in Comparative Example 1. The data (1) to (6) in Table 7 correspond to the points (1) to (6) in FIG. 5(*a*), respectively.

TABLE 7

| | (1) | (2) | (3) | (4) | (5) | (atomic %) (6) |
|---|---|---|---|---|---|---|
| Re | 0.0 | 0.0 | 0.0 | 0.0 | 0.0 | 0.0 |
| Ni | 52.7 | 55.7 | 57.7 | 2.9 | 16.4 | 33.1 |
| Cr | 20.9 | 15.6 | 13.9 | 34.8 | 26.1 | 6.6 |
| Fe | 19.1 | 20.8 | 20.1 | 2.2 | 7.0 | 10.3 |
| Mo | 2.0 | 3.5 | 3.3 | 0.2 | 0.1 | 0.0 |
| Nb | 3.0 | 2.9 | 3.6 | 0.0 | 0.3 | 0.5 |
| Al | 1.2 | 0.8 | 0.5 | 0.2 | 0.6 | 0.7 |
| Ti | 1.1 | 0.7 | 0.9 | 0.1 | 0.0 | 0.0 |
| O | 0.0 | 0.0 | 0.0 | 59.6 | 49.5 | 48.8 |

Table 8 shows the analysis result of the composition of each point of the section of an oxidized test piece of the Ni-based alloy in Comparative Example 2. The data (1) to (6) in Table 8 correspond to the points (1) to (6) in FIG. 5(*b*), respectively.

TABLE 8

| | (1) | (2) | (3) | (4) | (5) | (atomic %) (6) |
|---|---|---|---|---|---|---|
| Re | 0.0 | 0.0 | 0.0 | 0.0 | 0.0 | 0.0 |
| Ni | 53.0 | 49.9 | 46.6 | 57.7 | 61.8 | 19.8 |
| Cr | 21.0 | 17.6 | 12.8 | 5.3 | 4.9 | 0.9 |
| Fe | 19.1 | 15.6 | 15.2 | 10.2 | 11.9 | 5.1 |
| Mo | 1.9 | 2.0 | 2.1 | 0.5 | 0.3 | 0.0 |
| Nb | 3.2 | 2.9 | 2.8 | 0.1 | 0.3 | 0.3 |
| Al | 0.9 | 10.2 | 18.2 | 25.4 | 20.1 | 22.7 |
| Ti | 0.9 | 1.8 | 2.3 | 0.8 | 0.7 | 0.1 |
| O | 0.0 | 0.0 | 0.0 | 0.0 | 0.0 | 51.1 |

Table 9 shows the analysis result of the composition of each point of the section of an oxidized test piece of the Ni-based alloy in Comparative Example 3. The data (1) to (6) in Table 9 correspond to the points (1) to (6) in FIG. 5(*c*), respectively.

TABLE 9

| | (1) | (2) | (3) | (4) | (5) | (atomic %) (6) |
|---|---|---|---|---|---|---|
| Re | 0.0 | 1.2 | 10.1 | 0.7 | 0.0 | 0.0 |
| Ni | 53.4 | 51.0 | 39.3 | 58.7 | 66.1 | 7.3 |
| Cr | 20.8 | 18.6 | 16.9 | 5.4 | 2.4 | 0.4 |
| Fe | 19.1 | 15.2 | 13.7 | 10.2 | 7.1 | 4.3 |
| Mo | 1.6 | 2.1 | 1.9 | 0.3 | 0.0 | 0.0 |
| Nb | 3.0 | 2.6 | 2.2 | 0.8 | 0.7 | 0.2 |
| Al | 1.0 | 8.5 | 14.5 | 23.5 | 23.3 | 28.5 |
| Ti | 1.1 | 0.8 | 0.8 | 0.4 | 0.4 | 0.2 |
| O | 0.0 | 0.0 | 0.0 | 0.0 | 0.0 | 59.1 |

Figure 6:
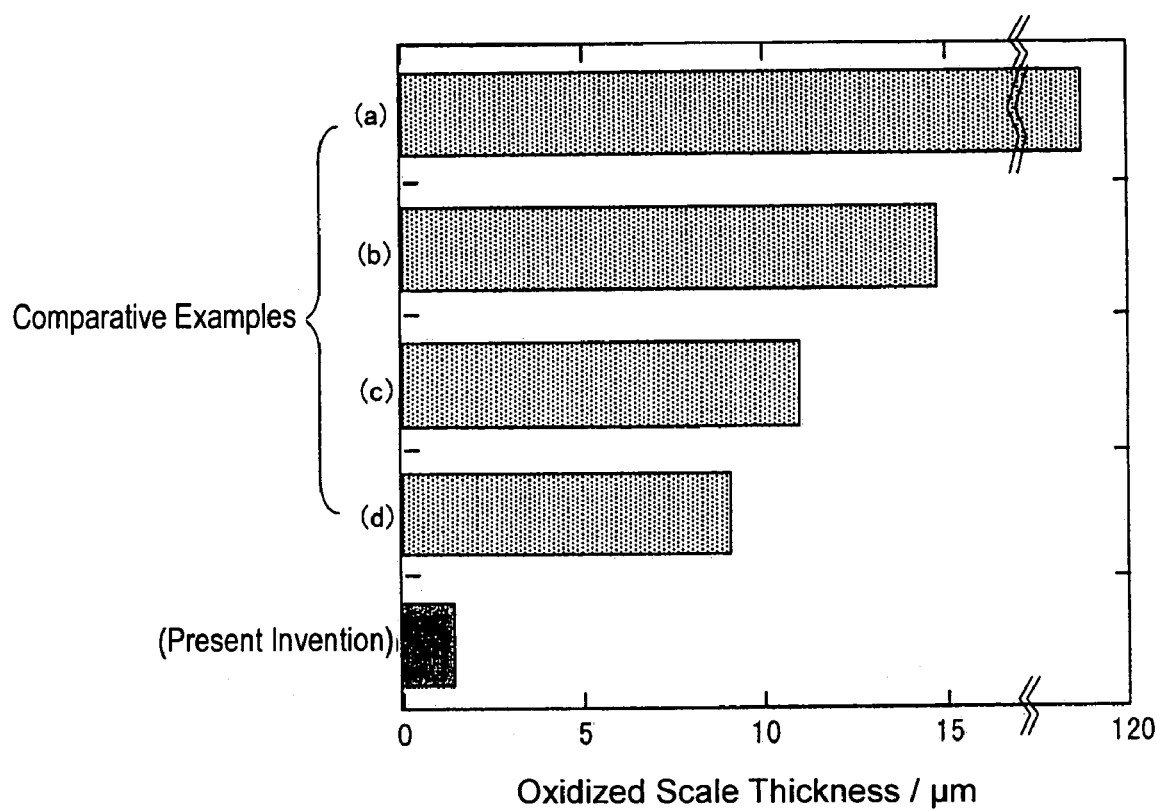
FIG. 6 is a graph showing the thickness of an oxidized scale of each of Inventive Example 1 and Comparative Examples 1 to 4 after oxidized in the atmosphere at 1100° C. for one month.

Table 10 shows the analysis result of the composition of each point of the section of an oxidized test piece of the Ni-based alloy in Comparative Example 4. The data (1) to (6) in Table 10 correspond to the points (1) to (6) in FIG. 5(*d*), respectively. Further, FIG. 6 shows the thickness of each oxidized scale created these surfaces.

TABLE 10

| | (1) | (2) | (3) | (4) | (5) | (atomic %) (6) |
|---|---|---|---|---|---|---|
| Re | 0.0 | 1.2 | 11.0 | 1.2 | 0.0 | 0.0 |
| Ni | 53.1 | 48.0 | 9.7 | 45.4 | 47.3 | 4.1 |
| Cr | 19.8 | 26.0 | 58.8 | 24.3 | 23.4 | 3.1 |
| Fe | 20.4 | 12.6 | 4.3 | 4.4 | 3.9 | 3.9 |
| Mo | 1.6 | 1.9 | 1.8 | 0.4 | 0.2 | 0.0 |
| Nb | 3.0 | 2.2 | 1.1 | 0.9 | 0.8 | 0.2 |
| Al | 0.9 | 7.1 | 12.5 | 22.9 | 24.1 | 29.0 |
| Ti | 1.2 | 1.0 | 0.8 | 0.5 | 0.3 | 0.2 |
| O | 0.0 | 0.0 | 0.0 | 0.0 | 0.0 | 59.5 |

In Inventive Example 1, a dense oxidized scale with a thin thickness of about 2 μm containing $Al_2O_3$ almost without other elements was formed on the surface of the coating layer, and no peeling of the film was observed. In addition, neither the diffusion of the elements (e.g. Ti and Nb) of the substrate to the Ni—Al alloy diffusion layer nor the diffusion of Al of the Ni—Al alloy diffusion layer to the substrate were practically observed. The concentration Al in the Ni—Al alloy diffusion layer was maintained at about 50% approximately equal to that before oxidation, and no significant change was observed in the composition of the substrate. The Re alloy diffusion barrier layer also exhibited substantially the same composition as that before oxidation.

In contrast, the following results were obtained in Comparative Examples 1 to 3. In the pure Ni-based alloy ((a), Comparative Example 1), an oxidized scale composed of two layers consisting of an outer layer containing Ni, Fe and Cr as a primary component and an inner layer containing Cr as a primary component was formed on the surface thereof, and an oxide was formed within the substrate. The oxidized scale has a thick thickness of 100 μm or more, and the peeling of the film was observed at many portions.

In the Ni-based alloy (b) subjected only the Al diffusion coating in Comparative Examples 2, while an oxidized scale has a thickness of about 15 μm and contained Ni, Al and Fe as a primary component, the film had peeled portions as with Comparative Example 1. Further, while the Al concentration of the Ni—Al diffusion layer was about 50% before oxidation, it was reduced at about 20% after oxidation. Therefore, it can be proved that the reduction of the Al concentration was caused by the accelerated consumption of Al due to a high oxidizing speed, and the diffusion of Al to the substrate.

In the Ni-based alloy (c) subjected to the Al diffusion coating after coating the 10.3% Re-19.1% (Cr, Mo)-56.9% (Ni, Fe)-10.1% Al-3.6% (Nb, Ti) alloy coating in Comparative Example 3, while the peeling level of the film was low as compared to Comparative Examples 1 and 2, an oxidized scale having a thickness of about 11 μm and containing Ti and Nb in addition to Al, Ni and Fe as a primary component was created.

Given that the oxidized scale parabolically grows, if there is a 5 times difference in thickness between the oxidized scales of two different film, in the same time-period, these films will have a 25 times difference in life span therebetween. Thus, it can be said that the difference in thickness between the oxidized scales of the Inventive Example 1 and the Comparative Example 3 is significant.

Further, while the Al concentration of the Ni—Al diffusion layer was close to 50% before oxidation, it was reduced at about 23% after oxidation. The Al concentration in the vicinity of the surface of the substrate was also increased up to about 9%. Therefore, it can be proved that even if the 10.3% Re-19.1% (Cr, Mo)-56.9% (Ni, Fe)-10.1% Al-3.6% (Nb, Ti) alloy coating having a low Re concentration is coated, Ti and Nb will be diffused from the substrate from the coating layer, and Al will be diffused from the Ni—Al diffusion layer to the substrate, during oxidation at 1100° C.

The Ni-based alloy (d) subjected to the Al diffusion coating after coating the 10.8% Re-67.4% (Cr, Mo)-15.0% (Ni, Fe)-4.9% Al-1.9% (Nb, Ti) alloy coating in Comparative Example 4, exhibited a similar behavior to Comparative Example 3 to create an oxidized scale having a thickness of about 9 μm and containing Ti and Nb in addition to Al, Ni, Fe and Cr as a primary component.

While the Al concentration of the Ni—Al diffusion layer was close to 50% before oxidation, it was reduced at about 24% after oxidation. Therefore, it can be proved that even if the 10.8% Re-67.4% (Cr, Mo)-15.0% (Ni, Fe)-4.9% Al-1.9% (Nb, Ti) alloy coating having a low Re concentration is coated, Ti and Nb will be diffused from the substrate from the coating layer, and Al will be diffused from the Ni—Al diffusion layer to the substrate, during oxidation at 1100° C.

As seen in the above results, it is verified that Inventive Example 1 (47% atomic % Re-28.9 atomic % (Cr, Mo)-23.4 atomic % (Ni, Fe) alloy coating) as one example of the present invention brings out sufficient function as a diffusion barrier layer against oxidation at 1100° C. for one month to provide excellent oxidation resistance. By contrast, in not only the pure Ni-based alloy, but also the Ni-based alloy subjected only to the Al diffusion coating, and the Ni-based alloy coated with the low-concentration Re alloy coating and the Al diffusion layer, a thick oxidized scale is formed even if the Al concentration of the surface of the coating layer is approximately the same as Inventive Example 1, before oxidation. This is caused by the lowered Al concentration in connection with the diffusion of Al in the Al alloy layer to the substrate, and the deteriorated purity of $Al_2O_3$ in connection with the diffusion of Ti and/or Nb from the substrate to the oxidized scale, due to the activated diffusion between the respective elements of the substrate and the coating layer during the oxidation at 1100° C. for one month.

INDUSTRIAL APPLICABILITY

The Re alloy coating having an atomic composition of 30% to less than 90% Re, and an atomic composition of 5% to less than 60% X (wherein X is at least one selected from the group consisting of Cr, Mo and W) with the remainder except for inevitable impurities being at least one selected from the group consisting of Ni, Fe and Co can be coated on the surface of a high-temperature equipment member, or inserted between the substrate and the TBC layer, to provide excellent heat/corrosion resistances, and an extended life span as compared to conventional techniques.

What is claimed is:

1. A Re alloy coating for diffusion barrier formed on a substrate, in atomic composition, consisting of:
    40% to less than 90% of Re;
    5% to less than 60% in total of at least one selected from the group consisting of Mo and W; and
    the remainder being at least one selected from the group consisting of Ni, Fe and Co except for the inevitable impurities.

2. A Re alloy coating for diffusion barrier formed on a substrate, in atomic composition, consisting of:
    40% to less than 70% of Re;
    20% to less than 50% in total of at least one selected from the group consisting of Mo and W; and
    the remainder being at least one selected from the group consisting of Ni, Fe and Co except for inevitable impurities.

3. The Re alloy coating for diffusion barrier as defined in claim 1 or 2, wherein a diffusion layer containing at least one selected from the group consisting of Al, Si and Cr is laminated on said Re alloy coating, and wherein said Re alloy coating contains substantially none of said elements of said diffusion layer after a homogenizing heat treatment.

4. The Re alloy coating for diffusion barrier as defined in claim 1 or 2, wherein said substrate is made of a Ni-based alloy.

5. The Re alloy coating for diffusion barrier as defined in claim 1 or 2, wherein said Re alloy coating is formed as a continuous layer.

6. The Re alloy coating for diffusion barrier as defined in claim 5, which includes a stress relief layer which is made of an alloy containing Re, wherein the Re concentration is reduced by about 5 to 20 atomic %, and the concentration of either one of Ni, Fe and Co is increased by about 5 to 20 atomic %, as compared to those of the diffusion barrier layer and inserted between said Re alloy coating and said substrate.

7. The Re alloy coating for diffusion barrier as defined in claim 5, which includes a diffusion layer laminated on said Re alloy coating, said diffusion layer containing at least one selected from the group consisting of Al, Si and Cr.

8. The Re alloy coating for diffusion barrier as defined in claim 7, which includes a heat barrier ceramics laminated on said Re alloy coating.

* * * * *